US010455620B2

United States Patent
Hu et al.

(10) Patent No.: US 10,455,620 B2
(45) Date of Patent: Oct. 22, 2019

(54) RANDOM ACCESS METHOD AND APPARATUS

(71) Applicant: Huawei Technologies Co., Ltd., Shenzhen, Guangdong (CN)

(72) Inventors: Zhenxing Hu, Shenzhen (CN); Wei Quan, Beijing (CN); Xiaodong Yang, Beijing (CN); Bingzhao Li, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 15/216,949

(22) Filed: Jul. 22, 2016

(65) Prior Publication Data

US 2016/0330768 A1 Nov. 10, 2016

Related U.S. Application Data

(63) Continuation of application No. PCT/CN2014/071315, filed on Jan. 24, 2014.

(51) Int. Cl.
*H04W 74/08* (2009.01)
*H04W 74/00* (2009.01)
(Continued)

(52) U.S. Cl.
CPC ..... *H04W 74/0833* (2013.01); *H04W 72/042* (2013.01); *H04W 74/006* (2013.01); *H04W 4/046* (2013.01); *H04W 4/90* (2018.02)

(58) Field of Classification Search
CPC ........... H04W 74/0833; H04W 72/042; H04W 74/006; H04W 4/22; H04W 4/046
See application file for complete search history.

(56) References Cited

U.S. PATENT DOCUMENTS

2006/0018289 A1* 1/2006 Schulist ............... H04W 52/50
370/335
2009/0135775 A1* 5/2009 Ou .................... H04W 74/0841
370/329
(Continued)

FOREIGN PATENT DOCUMENTS

CN 102111887 A 6/2011
CN 102231917 A 11/2011
(Continued)

OTHER PUBLICATIONS

"PRACH Coverage Enhancement for MTC UE", Alcatel-Lucent, Alcatel-Lucent Shanghai Bell, 3GPP TSG-RAN WG1 Meeting #75, Nov. 11-15, 2013, 8 pages, R1-135155.
(Continued)

*Primary Examiner* — Raj Jain
*Assistant Examiner* — Harry H Kim
(74) *Attorney, Agent, or Firm* — Leydig, Voit & Mayer, Ltd.

(57) ABSTRACT

Embodiments of the present invention provide a random access method and an apparatus. PRACH configuration information of a base station is acquired, and a preamble is sent from a corresponding start PRACH resource, so that access of another terminal device is not affected when the base station identifies an access request of a terminal device that requires coverage enhancement. The solution includes: acquiring at least one group of physical random access channel PRACH configuration information that has been stored, where the at least one group of PRACH configuration information is carried in system information sent by the base station; parsing the at least one group of PRACH configuration information to obtain a corresponding start PRACH resource; and sending a preamble to the base station starting from the start PRACH resource, so that the base station establishes a connection to the terminal device according to the preamble.

6 Claims, 5 Drawing Sheets

(51) Int. Cl.
*H04W 72/04* (2009.01)
*H04W 4/90* (2018.01)
*H04W 4/04* (2009.01)

(56) References Cited

U.S. PATENT DOCUMENTS

| | | |
|---|---|---|
| 2012/0099543 A1 | 4/2012 | Yang et al. |
| 2013/0040597 A1 | 2/2013 | Jang et al. |
| 2014/0098761 A1* | 4/2014 | Lee ............... H04W 74/006 370/329 |
| 2015/0016312 A1* | 1/2015 | Li ................... H04W 74/0833 370/280 |
| 2016/0173239 A1* | 6/2016 | Kim ............... H04L 1/1812 370/329 |

FOREIGN PATENT DOCUMENTS

| | | |
|---|---|---|
| CN | 102271418 A | 12/2011 |
| CN | 103369701 A | 10/2013 |

OTHER PUBLICATIONS

"PRACH coverage improvement for MTC UEs", ZTE, 3GPP TSG RAN WG1 Meeting #75, Nov. 11-15, 2013, 7 pages, R1-135359.
"Discussion on Multi-level PRACH Coverage Enhancement", NTT DocoMo, 3GPP TSG RAN WG1 Meeting #75, Nov. 11-15, 2013, 7 pages, R1-135509.
"3rd Generation Partnership Project; Technical Specification Group Radio Access Network; Evolved Universal Terrestrial Radio Access (E-UTRA); Medium Access Control (MAC) protocol specification (Release 10)" 36.321 v10.2.0, Jun. 2011, 54 pages.

* cited by examiner

RANDOM ACCESS METHOD AND APPARATUS

CROSS-REFERENCE TO RELATED APPLICATIONS

This application is a continuation of International Application No. PCT/CN2014/071315, filed on Jan. 24, 2014, which is hereby incorporated by reference in its entirety.

TECHNICAL FIELD

The present invention relates to the communications field, and in particular, to a random access method and an apparatus.

BACKGROUND

With increasing development of the science and technology, data interaction between a base station and user equipment is increasingly frequent, and accordingly, a requirement on data interaction quality greatly increases, and therefore requirements of the user equipment on an area covered by a signal sent by the base station and on signal transceiving quality are becoming increasingly high.

However, compared with ordinary UE, some UE (user equipment, terminal device) may locate in a coverage area in which a signal is worse, for example, machine-type communications terminals such as an electricity meter and a water meter that are placed in a building, a basement, or an iron box. Signals in these places are not very good, and may have an extra maximum signal loss of 20 dB. To compensate the foregoing signal loss, generally a manner in which a signal is repeatedly sent (that is, spectrum spreading) is used to enhance the signal.

Specifically, in the prior art, when UE needs to perform random access, the UE first selects a random access code, and then selects a PRACH (physical random access channel) based on a PRACH configuration in system information. Then, the UE sends, on the selected PRACH, the selected random access code, and starts to attempt to acquire a random access response sent by a base station after duration of three subframes, where the random access response is scheduled by scrambling a PDCCH with an RA-RNTI (random access radio network temporary identifier).

For UE whose coverage level is worse, a same preamble needs to be sent by using multiple consecutive PRACH resources, and in this case, the following problems may occur: Because the coverage level of the UE is worse, in a process in which a preamble signal is repeatedly sent, the base station may be incapable of completely detecting all the same preambles. As a result, the base station cannot accurately determine start and end positions in which the UE repeatedly sends the PRACH resources of the preamble, and therefore correct access cannot be implemented. In addition, because normal UE (that is, coverage enhancement is not required) may still select a same PRACH resource, in this case, a conflict may occur between an FAR (random access response) repeatedly sent by the base station and an RAR obtained by a request of the normal UE. Therefore, the normal UE cannot correctly access the base station.

SUMMARY

Embodiments of the present invention provide a random access method and an apparatus, where PRACH configuration information of a base station is acquired, and then a corresponding start PRACH resource is parsed and a preamble is sent, so that access of another terminal device is not affected when the base station identifies an access request of a terminal device that requires coverage enhancement.

To achieve the foregoing objective, the following technical solutions are used in the embodiments of the present invention:

According to a first aspect, an embodiment of the present invention provides a terminal device, including:

a first acquiring unit, configured to acquire at least one group of physical random access channel PRACH configuration information that has been stored, where the at least one group of PRACH configuration information is carried in system information sent by a base station;

a processing unit, configured to parse the at least one group of PRACH configuration information to obtain a corresponding start PRACH resource; and a first sending unit, configured to send a preamble to the base station starting from the start PRACH resource, so that the base station establishes a connection to the terminal device according to the preamble.

In a first possible implementation manner of the first aspect, the system message includes at least the at least one group of PRACH configuration information, where content of the PRACH configuration information includes a preset periodic time and/or a preset start position.

With reference to the foregoing first aspect and the first possible implementation manner of the first aspect, in a second possible implementation manner of the first aspect:

the first acquiring unit is further configured to receive the system message from the base station; and the processing unit is further configured to: calculate, according to downlink information, a path loss generated in a signal transmission process, and determine a matched coverage enhancement level according to the path loss.

With reference to the foregoing first aspect and the first to the second possible implementation manners of the first aspect, in a third possible implementation manner of the first aspect:

the first acquiring unit is further configured to: acquire, on a PDCCH channel according to a specified random access radio network temporary identifier RA-RNTI calculation formula, downlink resource information sent by the base station; and receive a random access response RAR from the base station according to a channel specified by descrambled downlink resource information, where an msg3 is sent according to a quantity of repetition times corresponding to a repetition times index carried by the RAR.

With reference to the foregoing first aspect and the first to the third possible implementation manners of the first aspect, in a fourth possible implementation manner of the first aspect, the terminal device further includes:

a determining unit, configured to: if the acquired downlink resource information carries rejection information, quit sending the preamble to the base station within a preset period of time, where the rejection information includes a rejection instruction and/or the preset period of time.

With reference to the foregoing first aspect and the first to the fourth possible implementation manners of the first aspect, in a fifth possible implementation manner of the first aspect:

the first acquiring unit is further configured to acquire, on the PDCCH channel, downlink resource information that is of a specified downlink control information DCI format and is sent by the base station; and the first sending unit is further configured to: send the msg3 according to the quantity of repetition times corresponding to the repetition times index carried by the RAR, where the RAR is received from the base station according to the downlink resource information of the specified DCI format.

With reference to the foregoing first aspect and the first to the fifth possible implementation manners of the first aspect, in a sixth possible implementation manner of the first aspect, the system message received from the base station includes multiple groups of PRACH configuration information, and each group of PRACH configuration information is corresponding to a coverage enhancement level, where the processing unit is specifically configured to: match corresponding PRACH configuration information according to the matched coverage enhancement level; and acquire the corresponding start PRACH resource according to the matched PRACH configuration information.

With reference to the foregoing first aspect and the first to the sixth possible implementation manners of the first aspect, in a seventh possible implementation manner of the first aspect:

the system message from the base station further includes at least one group of extended access class barring EACB parameter, and each group of EACB parameter is corresponding to a coverage enhancement level, where the processing unit is further configured to select a corresponding EACB parameter according to the corresponding coverage enhancement level, so as to determine, according to the EACB parameter, whether the base station allows access, where a result of the determining according to the EACB parameter is used to indicate whether the preamble is sent to the base station from the start PRACH resource according to a preset frequency.

With reference to the foregoing first aspect and the first to the seventh possible implementation manners of the first aspect, in an eighth possible implementation manner of the first aspect:

the determining unit is further configured to: if the result of the determining according to the EACB parameter is to allow access, perform an extended access barring EAB decree and/or an ACB decree, where a result of the EAB decree and/or the ACB decree is used to indicate whether the preamble is sent to the base station from the start PRACH resource according to the preset frequency.

According to a second aspect, an embodiment of the present invention provides a base station, including:

a configuration unit, configured to: pre-configure a physical random access channel PEACH resource, and generate at least one group of PRACH configuration information to send to a terminal device, so that the terminal device acquires the at least one group of PRACH configuration information, and the terminal device matches a corresponding start PEACH resource according to the at least one group of PRACH configuration information, where content of the PEACH configuration information includes a preset periodic time and/or a preset start position;

a second acquiring unit, configured to: receive a preamble from the terminal device, and perform, according to a specified random access radio network temporary identifier RA-RNTI calculation formula, scrambling on downlink resource information corresponding to the start PRACH resource; and a second sending unit, configured to send, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

In a first possible implementation manner of the second aspect:

the second sending unit is further configured to send a random access response RAR to the terminal device, so that the terminal device sends an msg3 according to a quantity of repetition times corresponding to a repetition times index carried by the RAR.

With reference to the foregoing second aspect and the first possible implementation manner of the second aspect, in a second possible implementation manner of the second aspect:

the second sending unit is further configured to send, on the PDCCH channel, rejection information to the terminal device, so that the terminal device quits sending the preamble within a preset period of time, where the rejection information includes a rejection instruction and/or the preset period of time.

With reference to the foregoing second aspect and the first to the second possible implementation manners of the second aspect, in a third possible implementation manner of the second aspect:

the second sending unit is further configured to: send, on the PDCCH channel, downlink resource information of a specified downlink control information DCI format to the terminal device, so that the terminal device receives the downlink resource information of the specified DCI format; and send the random access response RAR to the terminal device after a preset processing time, so that the terminal device sends the msg3 according to the quantity of repetition times corresponding to the repetition times index carried by the RAR.

With reference to the foregoing second aspect and the first to the third possible implementation manners of the second aspect, in a fourth possible implementation manner of the second aspect:

the configuration unit is further configured to configure at least one group of extended access class barring EACB parameter and send the at least one group of EACB parameter to the terminal device, where each group of EACB parameter is corresponding to a coverage enhancement level.

According to a third aspect, an embodiment of the present invention provides a terminal device, including:

a receiver, configured to acquire at least one group of physical random access channel PRACH configuration information that has been stored, where the at least one group of PRACH configuration information is carried in system information sent by a base station;

a processor, configured to parse the at least one group of PRACH configuration information to obtain a corresponding start PRACH resource; and a transmitter, configured to send a preamble to the base station starting from the start PRACH resource, so that the base station establishes a connection to the terminal device according to the preamble.

In a first possible implementation manner of the third aspect, the system message includes at least the at least one group of PRACH configuration information, where content of the PRACH configuration information includes a preset periodic time and/or a preset start position.

With reference to the foregoing third aspect and the first possible implementation manner of the third aspect, in a second possible implementation manner of the third aspect:

the receiver is further configured to receive the system message from the base station; and the processor is further configured to: calculate, according to downlink information, a path loss generated in a signal transmission process, and determine a matched coverage enhancement level according to the path loss.

With reference to the foregoing third aspect and the first to the second possible implementation manners of the third aspect, in a third possible implementation manner of the third aspect:

the transmitter is further configured to acquire, on a PDCCH channel according to a specified random access radio network temporary identifier RA-RNTI calculation formula, downlink resource information sent by the base station; and the receiver is further configured to receive a random access response RAR from the base station according to a channel specified by descrambled downlink resource information, where an msg3 is sent according to a quantity of repetition times corresponding to a repetition times index carried by the RAR.

With reference to the foregoing third aspect and the first to the third possible implementation manners of the third aspect, in a fourth possible implementation manner of the third aspect:

the processor is further configured to: if the acquired downlink resource information carries rejection information, quit sending the preamble to the base station within a preset period of time, where the rejection information includes a rejection instruction and/or the preset period of time.

With reference to the foregoing third aspect and the first to the fourth possible implementation manners of the third aspect, in a fifth possible implementation manner of the third aspect:

the receiver is further configured to: acquire, on the PDCCH channel, downlink resource information that is of a specified downlink control information DCI format and is sent by the base station; and receive the RAR from the base station according to the downlink resource information of the specified DCI format, where the msg3 is sent according to the quantity of repetition times corresponding to the repetition times index carried by the RAR.

With reference to the foregoing third aspect and the first to the fifth possible implementation manners of the third aspect, in a sixth possible implementation manner of the third aspect, the system message received from the base station includes multiple groups of PRACH configuration information, and each group of PRACH configuration information is corresponding to a coverage enhancement level, where the processor is specifically configured to: match corresponding PRACH configuration information according to the matched coverage enhancement level; and acquire the corresponding start PRACH resource according to the matched PRACH configuration information.

With reference to the foregoing third aspect and the first to the sixth possible implementation manners of the third aspect, in a seventh possible implementation manner of the third aspect, the system message from the base station further includes at least one group of extended access class barring EACB parameter, and each group of EACB parameter is corresponding to a coverage enhancement level, where the processor is further configured to select a corresponding EACB parameter according to the corresponding coverage enhancement level, so as to determine, according to the EACB parameter, whether the base station allows access, where a result of the determining according to the EACB parameter is used to indicate whether the preamble is sent to the base station from the start PRACH resource according to a preset frequency.

With reference to the foregoing third aspect and the first to the seventh possible implementation manners of the third aspect, in an eighth possible implementation manner of the third aspect:

the processor is further configured to: if the result of the determining according to the EACB parameter is to allow access, perform an extended access barring EAB decree and/or an ACB decree, where a result of the EAB decree and/or the ACB decree is used to indicate whether the preamble is sent to the base station from the start PRACH resource according to the preset frequency.

According to a fourth aspect, an embodiment of the present invention provides a base station, including:

a processor, configured to: pre-configure a physical random access channel PRACH resource, and generate at least one group of PEACH configuration information to send to a terminal device, so that the terminal device acquires the at least one group of PRACH configuration information, and the terminal device matches a corresponding start PRACH resource according to the at least one group of PRACH configuration information, where content of the PRACH configuration information includes a preset periodic time and/or a preset start position;

a receiver, configured to: receive a preamble from the terminal device, and perform, according to a specified random access radio network temporary identifier RA-RNTI calculation formula, scrambling on downlink resource information corresponding to the start PRACH resource; and a transmitter, configured to send, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

In a first possible implementation manner of the fourth aspect:

the transmitter is further configured to send a random access response RAR to the terminal device, so that the terminal device sends an msg3 according to a quantity of repetition times corresponding to a repetition times index carried by the RAR.

With reference to the foregoing fourth aspect and the first possible implementation manner of the fourth aspect, in a second possible implementation manner of the fourth aspect:

the receiver is further configured to send, on the PDCCH channel, rejection information to the terminal device, so that the terminal device quits sending the preamble within a preset period of time, where the rejection information includes a rejection instruction and/or the preset period of time.

With reference to the foregoing fourth aspect and the first to the second possible implementation manners of the fourth aspect, in a third possible implementation manner of the fourth aspect:

the transmitter is further configured to: send, on the PDCCH channel, downlink resource information of a specified downlink control information DCI format to the terminal device, so that the terminal device receives the downlink resource information of the specified DCI format; and send the random access response RAR to the terminal device after a preset processing time, so that the terminal device sends the msg3 according to the quantity of repetition times corresponding to the repetition times index carried by the RAR.

With reference to the foregoing fourth aspect and the first to the third possible implementation manners of the fourth aspect, in a fourth possible implementation manner of the fourth aspect:

the processor is further configured to configure at least one group of extended access class barring EACB parameter and send the at least one group of EACB parameter to the terminal device, where each group of EACB parameter is corresponding to a coverage enhancement level.

According to a fifth aspect, an embodiment of the present invention provides a random access method, including:

acquiring at least one group of physical random access channel PRACH configuration information that has been stored, where the at least one group of PRACH configuration information is carried in system information sent by a base station;

parsing the at least one group of PRACH configuration information to obtain a corresponding start PRACH resource; and sending a preamble to the base station starting from the start PRACH resource, so that the base station establishes a connection to the terminal device according to the preamble.

In a first possible implementation manner of the fifth aspect, the system message includes at least the at least one group of PRACH configuration information, where content of the PRACH configuration information includes a preset periodic time and/or a preset start position.

With reference to the foregoing fifth aspect and the first possible implementation manner of the fifth aspect, in a second possible implementation manner of the fifth aspect, before the acquiring PRACH configuration information that has been stored, the method further includes:

receiving the system message from the base station; and calculating, according to downlink information, a path loss generated in a signal transmission process, and determining a matched coverage enhancement level according to the path loss.

With reference to the foregoing fifth aspect and the first to the second possible implementation manners of the fifth aspect, in a third possible implementation manner of the fifth aspect, after the sending a preamble to the base station starting from the start PRACH resource, the method further includes:

acquiring, on a PDCCH channel according to a specified random access radio network temporary identifier RA-RNTI calculation formula, downlink resource information sent by the base station; and receiving a random access response RAR from the base station according to a channel specified by descrambled downlink resource information, where an msg3 is sent according to a quantity of repetition times corresponding to a repetition times index carried by the RAR.

With reference to the foregoing fifth aspect and the first to the third possible implementation manners of the fifth aspect, in a fourth possible implementation manner of the fifth aspect, after the acquiring, on a PDCCH channel according to a specified random access radio network temporary identifier RA-RNTI calculation formula, downlink resource information sent by the base station, the method further includes:

if the acquired downlink resource information carries rejection information, quitting sending the preamble to the base station within a preset period of time, where the rejection information includes a rejection instruction and/or the preset period of time.

With reference to the foregoing fifth aspect and the first to the fourth possible implementation manners of the fifth aspect, in a fifth possible implementation manner of the fifth aspect, after the sending a preamble to the base station starting from the start PRACH resource, the method further includes:

acquiring, on the PDCCH channel, downlink resource information that is of a specified downlink control information DCI format and is sent by the base station; and sending the msg3 according to the quantity of repetition times corresponding to the repetition times index carried by the RAR, where the RAR is received from the base station according to the downlink resource information of the specified DCI format.

With reference to the foregoing fifth aspect and the first to the fifth possible implementation manners of the fifth aspect, in a sixth possible implementation manner of the fifth aspect, the system message received from the base station includes multiple groups of PRACH configuration information, and each group of PRACH configuration information is corresponding to a coverage enhancement level, where the parsing the at least one group of PRACH configuration information to obtain a corresponding start PRACH resource includes:

matching corresponding PRACH configuration information according to the matched coverage enhancement level; and acquiring the corresponding start PRACH resource according to the matched PRACH configuration information.

With reference to the foregoing fifth aspect and the first to the sixth possible implementation manners of the fifth aspect, in a seventh possible implementation manner of the fifth aspect, the system message from the base station further includes at least one group of extended access class barring EACB parameter, and each group of EACB parameter is corresponding to a coverage enhancement level, where before the sending a preamble to the base station starting from the start PRACH resource, the method further includes:

selecting a corresponding EACB parameter according to the corresponding coverage enhancement level, so as to determine, according to the EACB parameter, whether the base station allows access, where a result of the determining according to the EACB parameter is used to indicate whether the preamble is sent to the base station from the start PRACH resource according to a preset frequency.

With reference to the foregoing fifth aspect and the first to the seventh possible implementation manners of the fifth aspect, in an eighth possible implementation manner of the fifth aspect, after the determining, according to the EACB parameter, whether the base station allows access, the method further includes:

if the result of the determining according to the EACB parameter is to allow access, performing an extended access barring EAB decree and/or an ACB decree, where a result of the EAB decree and/or the ACB decree is used to indicate whether the preamble is sent to the base station from the start PRACH resource according to the preset frequency.

According to a sixth aspect, an embodiment of the present invention provides a random access method, including:

pre-configuring a physical random access channel PRACH resource, and generating at least one group of PRACH configuration information to send to a terminal device, so that the terminal device acquires the at least one group of PRACH configuration information, and the terminal device matches a corresponding start PRACH resource according to the at least one group of PRACH configuration information, where content of the PRACH configuration information includes a preset periodic time and/or a preset start position;

receiving a preamble from the terminal device, and performing, according to a specified random access radio network temporary identifier RA-RNTI calculation formula, scrambling on downlink resource information corresponding to the start PRACH resource; and sending, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

In a first possible implementation manner of the sixth aspect, after the sending, on a PDCCH channel, scrambled downlink resource information to the terminal device, the method further includes:

sending a random access response RAR to the terminal device, so that the terminal device sends an msg3 according to a quantity of repetition times corresponding to a repetition times index carried by the RAR.

With reference to the foregoing sixth aspect and the first possible implementation manner of the sixth aspect, in a second possible implementation manner of the sixth aspect, after the receiving a preamble from the terminal device, the method further includes:

sending, on the PDCCH channel, rejection information to the terminal device, so that the terminal device quits sending the preamble within a preset period of time, where the rejection information includes a rejection instruction and/or the preset period of time.

With reference to the foregoing sixth aspect and the first to the second possible implementation manners of the sixth aspect, in a third possible implementation manner of the sixth aspect, after the receiving a preamble from the terminal device, the method further includes:

sending, on the PDCCH channel, downlink resource information of a specified downlink control information DCI format to the terminal device, so that the terminal device receives the downlink resource information of the specified DCI format; and sending the random access response RAR to the terminal device after a preset processing time, so that the terminal device sends the msg3 according to the quantity of repetition times corresponding to the repetition times index carried by the RAR.

With reference to the foregoing sixth aspect and the first to the third possible implementation manners of the sixth aspect, in a fourth possible implementation manner of the sixth aspect, the pre-configuring a physical random access channel PRACH resource, and generating at least one group of PRACH configuration information to send to a terminal device further includes:

configuring at least one group of extended access class barring EACB parameter and sending the at least one group of EACB parameter to the terminal device, where each group of EACB parameter is corresponding to a coverage enhancement level.

According to the random access method and the apparatus that are provided in the embodiments of the present invention, a base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

BRIEF DESCRIPTION OF THE DRAWINGS

To describe technical solutions in embodiments of the present invention more clearly, the following briefly describes accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes technical solutions in embodiments of the present invention with reference to accompanying drawings in the embodiments of the present invention. Apparently, the described embodiments are merely some embodiments of the present invention, but not all of the embodiments. All other embodiments obtained by a person of ordinary skill in the art based on the embodiments of the present invention without creative efforts shall fall within the protection scope of the present invention.

A terminal device may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks over a radio access network (for example, RAN, Radio Access Network). The wireless terminal may be a mobile terminal, for example, a mobile phone (alternatively referred to as a "cellular" phone) and a computer equipped with a mobile terminal.

A base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base transceiver station (BTS, Base Transceiver Station) in GSM or CDMA, may also be a NodeB (NodeB) in WCDMA, and may further be an evolved NodeB (NodeB, eNB, or e-NodeB, evolutional Node B) in an LTE, which is not limited in the present invention.

The embodiments of the present invention are applied to a radio communications system, and the radio communications system includes at least a terminal device and a base station.

According to a random access method and an apparatus that are provided in the embodiments of the present invention, a base station pre-configures multiple groups of PEACH configuration information for a terminal device that requires coverage enhancement and sends the multiple groups of PRACH configuration information to the terminal device, so that the terminal device parses the PRACH configuration information to obtain a corresponding start PEACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 1

Figure 1:
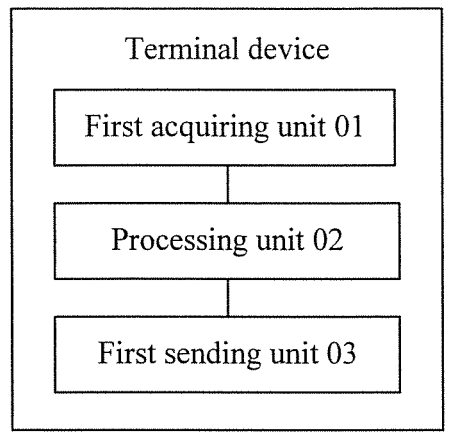
FIG. 1 is a schematic structural diagram 1 of a terminal device according to an embodiment of the present invention.

This embodiment of the present invention provides a terminal device. As shown in FIG. 1, the terminal device includes:

a first acquiring unit 01, configured to acquire at least one group of physical random access channel PRACH configuration information that has been stored, where the at least one group of PRACH configuration information is carried in system information sent by a base station;

a processing unit 02, configured to parse the at least one group of PRACH configuration information to obtain a corresponding start PRACH resource; and a first sending unit 03, configured to send a preamble to the base station starting from the start PRACH resource, so that the base station establishes a connection to the terminal device according to the preamble.

Further, the system message includes at least the at least one group of PRACH configuration information, where content of the PRACH configuration information includes a preset periodic time and/or a preset start position.

Further, the first acquiring unit 01 is further configured to receive the system message from the base station; and the processing unit 02 is further configured to: calculate, according to downlink information, a path loss generated in a signal transmission process, and determine a matched coverage enhancement level according to the path loss.

Further, the first acquiring unit 01 is further configured to: acquire, on a PDCCH channel according to a specified random access radio network temporary identifier RA-RNTI calculation formula, downlink resource information sent by the base station; and receive a random access response PAR from the base station according to a channel specified by descrambled downlink resource information, where an msg3 is sent according to a quantity of repetition times corresponding to a repetition times index carried by the RAR.

Figure 2:
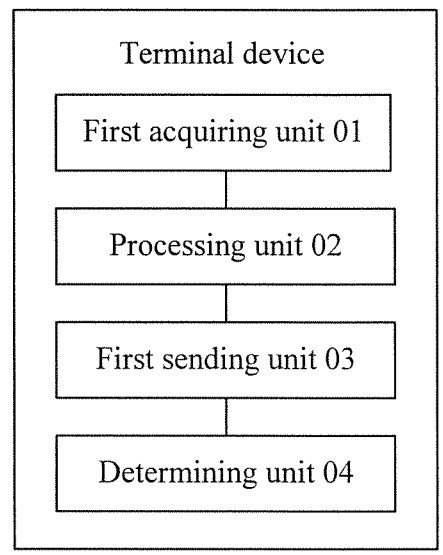
FIG. 2 is a schematic structural diagram 2 of a terminal device according to an embodiment of the present invention.

Further, as shown in FIG. 2, the terminal device further includes:

a determining unit 04, configured to: if the acquired downlink resource information carries rejection information, quit sending the preamble to the base station within a preset period of time, where the rejection information includes a rejection instruction and/or the preset period of time.

Further, the first acquiring unit 01 is further configured to acquire, on the PDCCH channel, downlink resource information that is of a specified downlink control information DCI format and is sent by the base station; and the first sending unit 03 is further configured to: send the msg3 according to the quantity of repetition times corresponding to the repetition times index carried by the RAR, where the RAR is received from the base station according to the downlink resource information of the specified DCI format.

Further, the system message received from the base station includes multiple groups of PRACH configuration information, and each group of PRACH configuration information is corresponding to a coverage enhancement level, where the processing unit 02 is specifically configured to: match corresponding PRACH configuration information according to the matched coverage enhancement level; and acquire the corresponding start PRACH resource according to the matched PRACH configuration information.

Further, the system message from the base station further includes at least one group of extended access class barring EACB parameter, and each group of EACB parameter is corresponding to a coverage enhancement level, where the processing unit 02 is further configured to select a corresponding EACB parameter according to the corresponding coverage enhancement level, so as to determine, according to the EACB parameter, whether the base station allows access, where a result of the determining according to the EACB parameter is used to indicate whether the preamble is sent to the base station from the start PRACH resource according to a preset frequency.

Further, the determining unit 04 is further configured to: if the result of the determining according to the EACB parameter is to allow access, perform an extended access barring EAB decree and/or an ACB decree, where a result of the EAB decree and/or the ACB decree is used to indicate whether the preamble is sent to the base station from the start PRACH resource according to the preset frequency.

According to the terminal device provided in this embodiment of the present invention, at least one group of physical random access channel PRACH configuration information that has been stored is acquired, where the at least one group of PRACH configuration information is carried in system information sent by a base station; the at least one group of PRACH configuration information is parsed to obtain a corresponding start PRACH resource; and a preamble is sent to the base station starting from the start PRACH resource, so that the base station establishes a connection to the terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 2

Figure 3:
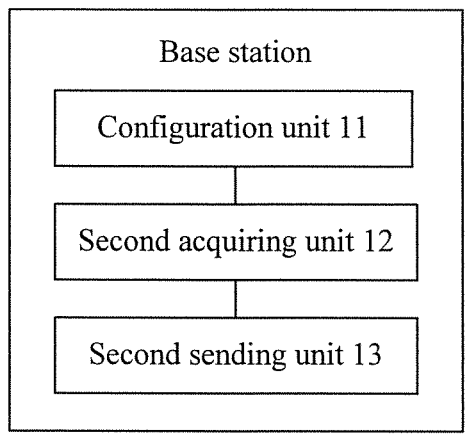
FIG. 3 is a schematic structural diagram of a base station according to an embodiment of the present invention.

This embodiment of the present invention provides a base station. As shown in FIG. 3, the base station includes:

a configuration unit 11, configured to: pre-configure a physical random access channel PRACH resource, and generate at least one group of PRACH configuration information to send to a terminal device, so that the terminal device acquires the at least one group of PRACH configuration information, and the terminal device matches a corresponding start PRACH resource according to the at least one group of PRACH configuration information, where content of the PRACH configuration information includes a preset periodic time and/or a preset start position;

a second acquiring unit 12, configured to: receive a preamble from the terminal device, and perform, according to a specified random access radio network temporary identifier RA-RNTI calculation formula, scrambling on downlink resource information corresponding to the start PRACH resource; and a second sending unit 13, configured to send, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

Further, the second sending unit 13 is further configured to send a random access response RAR to the terminal device, so that the terminal device sends an msg3 according to a quantity of repetition times corresponding to a repetition times index carried by the RAR.

Further, the second sending unit 13 is further configured to send, on the PDCCH channel, rejection information to the terminal device, so that the terminal device quits sending the preamble within a preset period of time, where the rejection information includes a rejection instruction and/or the preset period of time.

Further, the second sending unit 13 is further configured to: send, on the PDCCH channel, downlink resource information of a specified downlink control information DCI format to the terminal device, so that the terminal device receives the downlink resource information of the specified DCI format; and send the random access response RAR to the terminal device after a preset processing time, so that the terminal device sends the msg3 according to the quantity of repetition times corresponding to the repetition times index carried by the RAR.

Further, the configuration unit 11 is further configured to configure at least one group of extended access class barring EACB parameter and send the at least one group of EACB parameter to the terminal device, where each group of EACB parameter is corresponding to a coverage enhancement level.

According to the base station provided in this embodiment of the present invention, at least one group of physical random access channel PRACH configuration information that has been stored is acquired, where the at least one group of PRACH configuration information is carried in system information sent by the base station; the at least one group of PRACH configuration information is parsed to obtain a corresponding start PRACH resource; and a preamble is sent to the base station starting from the start PRACH resource, so that the base station establishes a connection to a terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 3

Figure 4:
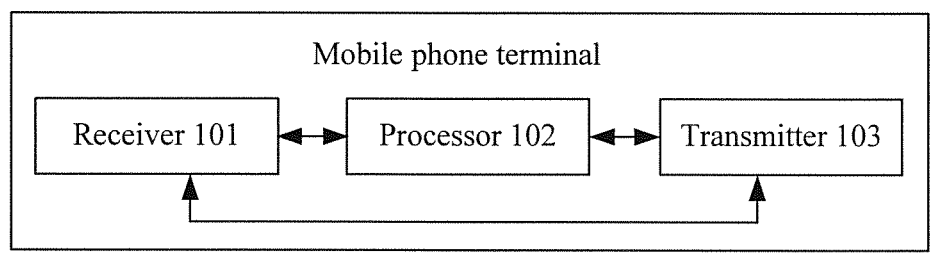
FIG. 4 is a schematic structural diagram of hardware of a mobile phone terminal according to an embodiment of the present invention.

FIG. 4 shows a schematic diagram of hardware of a terminal device according to the present invention.

The terminal device may be a machine, such as a mobile phone, a PC, an electricity meter, or a water meter, and a mobile phone terminal is used as an example for description in this embodiment.

As shown in FIG. 4, the mobile phone terminal includes a receiver 101, a processor 102, and a transmitter 103, where the processor 102 of the mobile phone terminal is a control center of the mobile phone terminal, and executes various functions of the mobile phone terminal and processes data by running or executing a software program and/or a module in a memory.

The receiving module 101 and the sending module 103 may be configured to: receive and send a signal in an information receiving and sending process or a call process, and in particular, for the mobile phone terminal, after receiving downlink information of a base station, send the downlink information to the processor 102 for processing; and in addition, send designed uplink data to the base station. The receiving module 101 and the sending module 103 may communicate with a network and another device by means of wireless communication. The wireless communication may use any communication standard or protocol, including but not being limited to GSM (Global System of Mobile communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), an LTE (Long Term Evolution, Long Term Evolution), an email, an SMS (Short Messaging Service, short message service), and the like.

In this embodiment of the present invention, the receiver 101 is configured to acquire at least one group of physical random access channel PRACH configuration information that has been stored, where the at least one group of PRACH configuration information is carried in system information sent by the base station; the processor 102 is configured to parse the at least one group of PRACH configuration information to obtain a corresponding start PRACH resource; and the transmitter 103 is configured to send a preamble to the base station starting from the start PRACH resource, so that the base station establishes a connection to the terminal device according to the preamble.

Further, the system message includes at least the at least one group of PRACH configuration information, where content of the PRACH configuration information includes a preset periodic time and/or a preset start position.

Further, the receiver 101 is further configured to receive the system message from the base station; and the processor 102 is further configured to: calculate, according to downlink information, a path loss generated in a signal transmission process, and determine a matched coverage enhancement level according to the path loss.

Further, the transmitter 103 is further configured to acquire, on a PDCCH channel according to a specified random access radio network temporary identifier RA-RNTI calculation formula, downlink resource information sent by the base station; and the receiver 101 is further configured to receive a random access response RAR from the base station according to a channel specified by descrambled downlink resource information, where an msg3 is sent according to a quantity of repetition times corresponding to a repetition times index carried by the RAR.

Further, the processor 102 is further configured to: if the acquired downlink resource information carries rejection information, quit sending the preamble to the base station within a preset period of time, where the rejection information includes a rejection instruction and/or the preset period of time.

Further, the receiver 101 is further configured to: acquire, on the PDCCH channel, downlink resource information that is of a specified downlink control information DCI format and is sent by the base station; and receive the RAR from the base station according to the downlink resource information of the specified DCI format, where the msg3 is sent according to the quantity of repetition times corresponding to the repetition times index carried by the RAR.

Further, the system message received from the base station includes multiple groups of PRACH configuration information, and each group of PRACH configuration information is corresponding to a coverage enhancement level, where the processor 102 is specifically configured to: match corresponding PRACH configuration information according to the matched coverage enhancement level; and acquire the corresponding start PRACH resource according to the matched PRACH configuration information.

Further, the system message from the base station further includes at least one group of extended access class barring EACB parameter, and each group of EACB parameter is corresponding to a coverage enhancement level, where the processor 102 is further configured to select a corresponding EACB parameter according to the corresponding coverage enhancement level, so as to determine, according to the EACB parameter, whether the base station allows access, where a result of the determining according to the EACB parameter is used to indicate whether the preamble is sent to the base station from the start PRACH resource according to a preset frequency.

Further, the processor 102 is further configured to: if the result of the determining according to the EACB parameter is to allow access, perform an extended access barring EAB decree and/or an ACB decree, where a result of the EAB decree and/or the ACB decree is used to indicate whether the preamble is sent to the base station from the start PRACH resource according to the preset frequency.

According to the terminal device provided in this embodiment of the present invention, at least one group of physical random access channel PRACH configuration information that has been stored is acquired, where the at least one group of PRACH configuration information is carried in system information sent by a base station; the at least one group of PRACH configuration information is parsed to obtain a corresponding start PRACH resource; and a preamble is sent to the base station starting from the start PRACH resource, so that the base station establishes a connection to the terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 4

Figure 5:
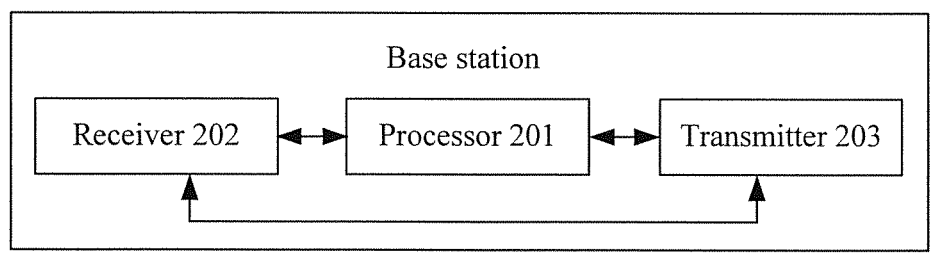
FIG. 5 is a schematic structural diagram of hardware of a base station according to an embodiment of the present invention.

FIG. 5 shows a schematic diagram of hardware of a base station according to the present invention.

As shown in FIG. 5, the base station includes a processor 201, a receiver 202, and a transmitter 203, where the processor 201 is configured to: pre-configure a physical random access channel PRACH resource, and generate at least one group of PRACH configuration information to send to a terminal device, so that the terminal device acquires the at least one group of PRACH configuration information, and the terminal device matches a corresponding start PRACH resource according to the at least one group of PRACH configuration information, where content of the PRACH configuration information includes a preset periodic time and/or a preset start position; the receiver 202 is configured to: receive a preamble from the terminal device, and perform, according to a specified random access radio network temporary identifier RA-RNTI calculation formula, scrambling on downlink resource information corresponding to the start PRACH resource; and the transmitter 203 is configured to send, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

Further, the transmitter 203 is further configured to send a random access response RAR to the terminal device, so that the terminal device sends an msg3 according to a quantity of repetition times corresponding to a repetition times index carried by the RAR.

Further, the receiver 202 is further configured to send, on the PDCCH channel, rejection information to the terminal device, so that the terminal device quits sending the preamble within a preset period of time, where the rejection information includes a rejection instruction and/or the preset period of time.

Further, the transmitter 203 is further configured to: send, on the PDCCH channel, downlink resource information of a specified downlink control information DCI format to the terminal device, so that the terminal device receives the downlink resource information of the specified DCI format;

and send the random access response RAR to the terminal device after a preset processing time, so that the terminal device sends the msg3 according to the quantity of repetition times corresponding to the repetition times index carried by the RAR.

Further, the processor 201 is further configured to configure at least one group of extended access class barring EACB parameter and send the at least one group of EACB parameter to the terminal device, where each group of EACB parameter is corresponding to a coverage enhancement level.

According to the terminal device provided in this embodiment of the present invention, at least one group of physical random access channel PRACH configuration information that has been stored is acquired, where the at least one group of PRACH configuration information is carried in system information sent by a base station; the at least one group of PRACH configuration information is parsed to obtain a corresponding start PRACH resource; and a preamble is sent to the base station starting from the start PRACH resource, so that the base station establishes a connection to the terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 5

Figure 6:
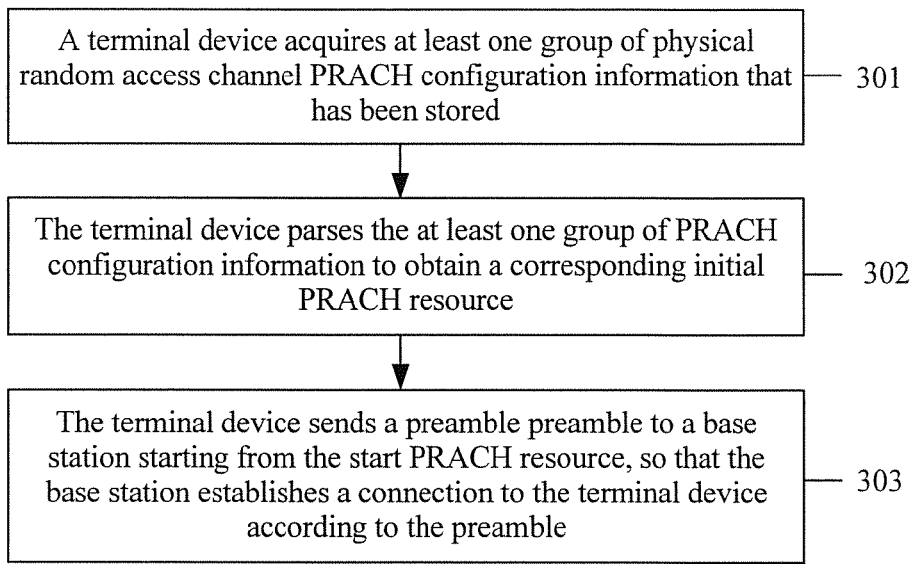
FIG. 6 is a schematic flowchart 1 of a random access method according to an embodiment of the present invention.

This embodiment of the present invention provides a random access method. As shown in FIG. 6, the method includes the following steps:

301. A terminal device acquires at least one group of physical random access channel PRACH configuration information that has been stored.

The at least one group of PRACH configuration information is carried in system information sent by a base station, and content of the PRACH configuration information includes a preset periodic time and/or a preset start position.

In the prior art, when a terminal device needs to perform random access, a random access code is first selected, and then a PRACH (physical random access channel, physical random access channel) is selected, where selection of the PRACH is based on a PRACH configuration in system information. Then, UE sends, on the selected PRACH, the selected random access code, and starts to attempt to acquire a random access response sent by a base station after duration of three subframes, where the random access response is scheduled by scrambling a PDCCH with an RA-RNTI. A calculating manner of the RA-RNTI is: RA-RNTI=1+t_id+10*f_id, where t_id is a first subframe corresponding to the selected PRACH, and a value range is [0, 10); f_id is a PRACH index corresponding to a subframe in which the selected PRACH locates. In the frequency domain, the index is sorted in an ascending order, and a value range is [0, 6)

In this embodiment of the present invention, the base station specially configures PRACH configuration information for a terminal device that requires coverage enhancement, so that the terminal device sends a preamble to the base station according to a corresponding start PRACH resource.

Preferably, the content of the PRACH configuration information may be the following one type or multiple types:

a. a preset period;

b. a preset period and a start position, where the start position is a start frequency;

c. a preset period and a start position, where the start position is a start time, and the start time is represented by a frame offset;

d. a preset period and a start position, where the start position is a start time, and the start time is represented by a frame offset and a subframe number;

e. a preset period and a start position, where the start position is a start frequency and a start time, and the start time is represented by a frame offset;

f. a preset period and a start position, where the start position is a start frequency and a start time, and the start time is represented by a frame offset and a subframe number.

Further, before acquiring the PRACH configuration information, the terminal device may further receive the system message from the base station, and then calculate, according to downlink information, a path loss generated in a signal transmission process, and determine a matched coverage enhancement level according to the path loss. The system message may carry multiple sets of PRACH configuration information, and each set of PRACH configuration information is corresponding to a coverage enhancement level. After an estimation on a basis of the path loss, the terminal device determines the matched coverage enhancement level, and then applies PRACH configuration information corresponding to the level.

302. The terminal device parses the at least one group of PRACH configuration information to obtain a corresponding start PRACH resource.

Specifically, after the terminal device acquires the at least one group of physical random access channel PRACH configuration information that has been stored, the terminal device parses the at least one group of PRACH configuration information, so as to obtain the corresponding start PRACH resource. The terminal device may acquire multiple groups of PRACH configuration information, so as to obtain corresponding multiple groups of start PRACH resources.

Preferably, the following is corresponding to step 301:

When the PRACH configuration information is the preset period, a start PRACH resource selected by the terminal device can only be a first PRACH resource in a frame whose system frame number modulo the period equals 0, or a start PRACH resource selected by the terminal device can only be a first PRACH resource in an even frame whose system frame number modulo the period equals 0;

when the PRACH configuration information is the preset period and the start position, and the start position is the start frequency, a start PRACH resource selected by the terminal device can only be a PRACH resource corresponding to a start frequency in a frame whose system frame number modulo the period equals 0, or a start PRACH resource selected by the terminal device can only be a PRACH resource corresponding to a start frequency in an even frame whose system frame number modulo the period equals 0;

when the PRACH configuration information is the preset period and the start position, the start position is the start time, and the start time is represented by the frame offset, a start PRACH resource selected by the terminal device can only be a first PRACH resource in a frame whose system frame number modulo the period equals the frame offset, or a start PRACH resource selected by the terminal device can only be a first PRACH resource in an even frame whose system frame number modulo the period equals the frame offset;

when the PRACH configuration information is the preset period and the start position, the start position is the start time, and the start time is represented by the frame offset and the subframe number, a start PRACH resource selected by the terminal device can only be a PRACH resource in a subframe corresponding to a subframe number, where the subframe corresponding to the subframe number is in a frame whose system frame number modulo the period equals the frame offset, or a start PRACH resource selected by the terminal device can only be a PRACH resource in a subframe corresponding to a subframe number, where the subframe corresponding to the subframe number is in an even frame whose system frame number modulo the period equals the frame offset;

when the PRACH configuration information is the preset period and the start position, the start position is the start frequency and the start time, and the start time is represented by the frame offset, a start PRACH resource selected by the terminal device can only be a PRACH resource corresponding to a start frequency in a frame whose system frame number modulo the period equals the frame offset, or a start PRACH resource selected by the terminal device can only be a PRACH resource corresponding to a start frequency in an even frame whose system frame number modulo the period equals the frame offset;

when the PRACH configuration information is the preset period and the start position, the start position is the start frequency and the start time, and the start time is represented by the frame offset and the subframe number, a start PRACH resource selected by the terminal device can only be a PRACH resource corresponding to a start frequency in a subframe corresponding to a subframe number, where the subframe corresponding to the subframe number is in a frame whose system frame number modulo the period equals the frame offset, or a start PRACH resource selected by the terminal device can only be a PRACH resource corresponding to a start frequency (a frequency offset) in a subframe corresponding to a subframe number, where the subframe corresponding to the subframe number is in an even frame whose system frame number modulo the period equals the frame offset.

In this case, the terminal device parses the at least one group of PRACH configuration information to obtain the corresponding start PRACH resource.

303. The terminal device sends a preamble to a base station starting from the start PRACH resource, so that the base station establishes a connection to the terminal device according to the preamble.

Specifically, after the terminal device obtains the corresponding start PRACH resource, the terminal device starts to repeatedly send, starting from the start PRACH resource, the preamble to the base station according to calculated sending power of the preamble.

Specifically, for a selection of sending power of the preamble, the terminal device may select to send by using preset maximum sending power.

Alternatively, the terminal device calculates sending power of the preamble based on calculation on the path loss and a selection of a corresponding coverage enhancement level.

Further, after the terminal device sends the preamble to the base station starting from the start PRACH resource, the terminal device may further acquire, on a PDCCH channel according to a specified random access radio network temporary identifier RA-RNTI calculation formula, downlink resource information sent by the base station; and receive a random access response RAR from the base station according to a channel specified by descrambled downlink resource information, where an msg3 is sent according to a quantity of repetition times corresponding to a repetition times index carried by the RAR.

The specified RA-RNTI calculation formula may be:

$$RA\text{-}RNTI = 1 + t\_id + 10 * f\_id + X$$

X is an offset, and t_id and f_id indicate a first PRACH resource or a last PRACH resource used when the preamble is repeatedly sent.

It should be noted that, if the system message may carry the multiple sets of PRACH configuration information, and each set of PRACH configuration information is corresponding to a coverage enhancement level, when the terminal device calculates the RA-RNTI, multiple different coverage enhancement levels are corresponding to different offsets X. For example, for an enhancement level 1, the offset X may be 10, that is, RA-RNTI=1+t_id+10*f_id+10; for an enhancement level 2, the offset X is 20, that is, RA-RNTI=1+t_id+10*f_id+20.

In addition, the RA-RNTI may be acquired in a manner of configuration in the system information, instead of calculation, that is, an RA-RNTI of a corresponding terminal device is carried in the system information, so as to indicate an RA-RNTI corresponding to a coverage enhancement level.

Figure 7:
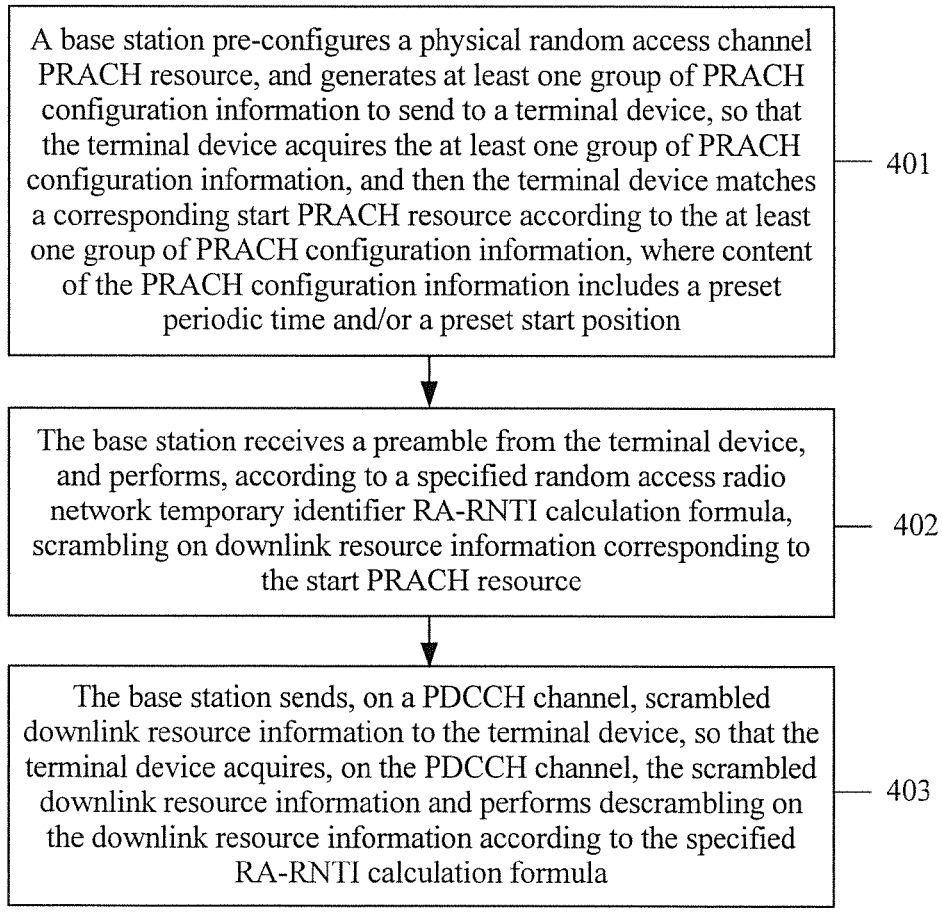
FIG. 7 is a schematic flowchart 2 of a random access method according to an embodiment of the present invention.

This embodiment of the present invention provides a random access method. As shown in FIG. 7, the method includes the following steps:

401. A base station pre-configures a physical random access channel PRACH resource, and generates at least one group of PRACH configuration information to send to a terminal device, so that the terminal device acquires the at least one group of PRACH configuration information, and then the terminal device matches a corresponding start PRACH resource according to the at least one group of PRACH configuration information, where content of the PRACH configuration information includes a preset periodic time and/or a preset start position.

According to the random access method and an apparatus that are provided in the embodiments of the present invention, a base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Preferably, the content of the PRACH configuration information may be the following one type or multiple types:
a. a preset period;
b. a preset period and a start position, where the start position is a start frequency;
c. a preset period and a start position, where the start position is a start time, and the start time is represented by a frame offset;
d. a preset period and a start position, where the start position is a start time, and the start time is represented by a frame offset and a subframe number;

e. a preset period and a start position, where the start position is a start frequency and a start time, and the start time is represented by a frame offset;

f. a preset period and a start position, where the start position is a start frequency and a start time, and the start time is represented by a frame offset and a subframe number.

Further, before acquiring the PRACH configuration information, the terminal device may further receive the system message from the base station, and then calculate, according to downlink information, a path loss generated in a signal transmission process, and determine a matched coverage enhancement level according to the path loss. The system message may carry multiple sets of PRACH configuration information, and each set of PRACH configuration information is corresponding to a coverage enhancement level. After an estimation on a basis of the path loss, the terminal device determines the matched coverage enhancement level, and then applies PRACH configuration information corresponding to the level.

402. The base station receives a preamble from the terminal device, and performs, according to a specified random access radio network temporary identifier RA-RNTI calculation formula, scrambling on downlink resource information corresponding to the start PRACH resource.

The specified RA-RNTI calculation formula may be:

$$RA\text{-}RNTI=1+t\_id+10*f\_id+X$$

X is an offset, and t_id and f_id indicate a first PRACH resource or a last PRACH resource used when the preamble is repeatedly sent.

It should be noted that, if the system message may carry the multiple sets of PRACH configuration information, and each set of PRACH configuration information is corresponding to a coverage enhancement level, when the terminal device calculates the RA-RNTI, multiple different coverage enhancement levels are corresponding to different offsets X. For example, for an enhancement level 1, the offset X may be 10, that is, RA-RNTI=1+t_id+10*f_id+10; for an enhancement level 2, the offset X is 20, that is, RA-RNTI=1+t_id+10*f_id+20.

In addition, the RA-RNTI may be acquired in a manner of configuration in the system information, instead of calculation, that is, an RA-RNTI of a corresponding terminal device is carried in the system information, so as to indicate an RA-RNTI corresponding to a coverage enhancement level.

403. The base station sends, on a PDCCH channel, scrambled downlink resource information to the terminal device, so that the terminal device acquires, on the PDCCH channel, the scrambled downlink resource information and performs descrambling on the downlink resource information according to the specified RA-RNTI calculation formula.

Specifically, after receiving the preamble, the base station sends a PDCCH scrambled by the RA-RNTI, and after completing sending the PDCCH, sends an RAR (Random Access Response, random access response) after a processing time, where the RAR may carry a repetition times index of an msg3. After receiving the RAR, and after a processing time, the terminal starts to send, according to a quantity of repetition times corresponding to the index of the quantity of repetition times, the msg3 by occupying an uplink authorized resource indicated by the RAR.

According to the random access method provided in this embodiment of the present invention, at least one group of physical random access channel PRACH configuration information that has been stored is acquired, where the at least one group of PRACH configuration information is carried in system information sent by abase station; the at least one group of PRACH configuration information is parsed to obtain a corresponding start PRACH resource; and a preamble is sent to the base station starting from the start PRACH resource, so that the base station establishes a connection to a terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 6

Figure 8:
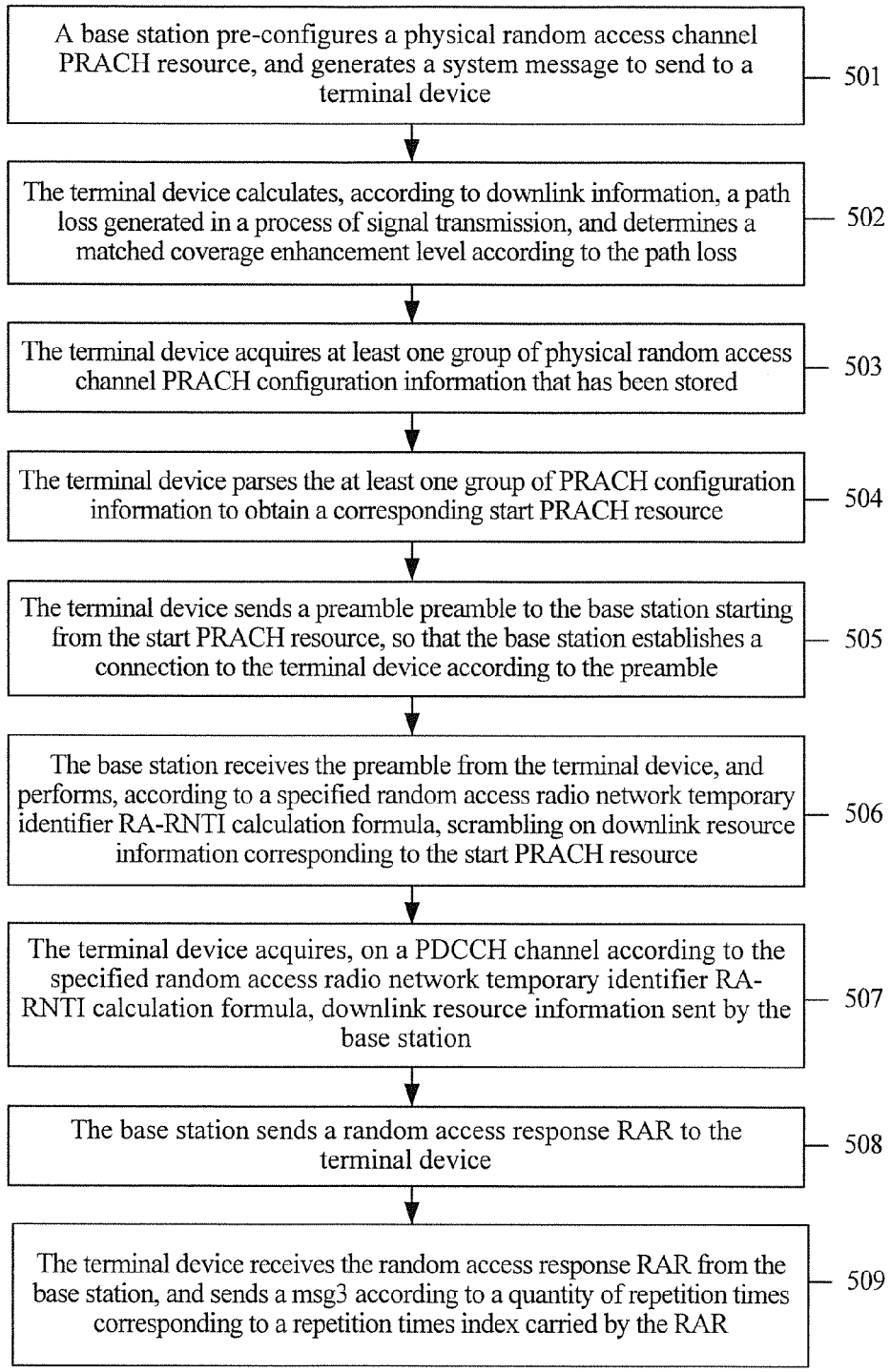
FIG. 8 is a schematic flowchart 3 of a random access method according to an embodiment of the present invention.

This embodiment of the present invention provides a random access method. As shown in FIG. 8, the method includes the following steps:

501. A base station pre-configures a physical random access channel PRACH resource, and generates a system message to send to a terminal device.

According to the random access method and an apparatus that are provided in the embodiments of the present invention, a base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

The at least one group of PRACH configuration information is carried in the system information sent by the base station, and content of the PRACH configuration information includes a preset periodic time and/or a preset start position.

Preferably, the content of the PRACH configuration information may be the following one type or multiple types:

a. a preset period;

b. a preset period and a start position, where the start position is a start frequency;

c. a preset period and a start position, where the start position is a start time, and the start time is represented by a frame offset;

d. a preset period and a start position, where the start position is a start time, and the start time is represented by a frame offset and a subframe number;

e. a preset period and a start position, where the start position is a start frequency and a start time, and the start time is represented by a frame offset;

f. a preset period and a start position, where the start position is a start frequency and a start time, and the start time is represented by a frame offset and a subframe number.

Further, before acquiring the PRACH configuration information, the terminal device may further receive the system message from the base station, and then calculate, according to downlink information, a path loss generated in a signal transmission process, and determine a matched coverage enhancement level according to the path loss. The system message may carry multiple sets of PRACH configuration information, and each set of PRACH configuration information is corresponding to a coverage enhancement level. After an estimation on a basis of the path loss, the terminal device determines the matched coverage enhancement level, and then applies PRACH configuration information corresponding to the level.

502. The terminal device calculates, according to downlink information, a path loss generated in a signal transmission process, and determines a matched coverage enhancement level according to the path loss.

Specifically, the terminal device receives the system message from the base station; and then calculates, according to the downlink information, the path loss generated in the signal transmission process, and determines the matched coverage enhancement level according to the path loss. The system message may carry the multiple sets of PRACH configuration information, and each set of PRACH configuration information is corresponding to a coverage enhancement level. After the estimation on the basis of the path loss, the terminal device determines the matched coverage enhancement level, and then applies the PRACH configuration information corresponding to the level.

In addition, the terminal device may calculate sending power of the preamble based on calculation on the path loss and a selection of a corresponding coverage enhancement level.

503. The terminal device acquires at least one group of physical random access channel PRACH configuration information that has been stored.

504. The terminal device parses the at least one group of PRACH configuration information to obtain a corresponding start PRACH resource.

Specifically, after the terminal device acquires the at least one group of physical random access channel PRACH configuration information that has been stored, the terminal device parses the at least one group of PRACH configuration information, so as to obtain the corresponding start PRACH resource. The terminal device may acquire multiple groups of PRACH configuration information, so as to obtain corresponding multiple groups of start PRACH resources.

Preferably, the following is corresponding to step 301:

When the PRACH configuration information is the preset period, a start PRACH resource selected by the terminal device can only be a first PRACH resource in a frame whose system frame number modulo the period equals 0, or a start PRACH resource selected by the terminal device can only be a first PRACH resource in an even frame whose system frame number modulo the period equals 0;

when the PRACH configuration information is the preset period and the start position, and the start position is the start frequency, a start PRACH resource selected by the terminal device can only be a PRACH resource corresponding to a start frequency in a frame whose system frame number modulo the period equals 0, or a start PRACH resource selected by the terminal device can only be a PRACH resource corresponding to a start frequency in an even frame whose system frame number modulo the period equals 0;

when the PRACH configuration information is the preset period and the start position, the start position is the start time, and the start time is represented by the frame offset, a start PRACH resource selected by the terminal device can only be a first PRACH resource in a frame whose system frame number modulo the period equals the frame offset, or a start PRACH resource selected by the terminal device can only be a first PRACH resource in an even frame whose system frame number modulo the period equals the frame offset;

when the PRACH configuration information is the preset period and the start position, the start position is the start time, and the start time is represented by the frame offset and the subframe number, a start PRACH resource selected by the terminal device can only be a PRACH resource in a subframe corresponding to a subframe number, where the subframe corresponding to the subframe number is in a frame whose system frame number modulo the period equals the frame offset, or a start PRACH resource selected by the terminal device can only be a PRACH resource in a subframe corresponding to a subframe number, where the subframe corresponding to the subframe number is in an even frame whose system frame number modulo the period equals the frame offset;

when the PRACH configuration information is the preset period and the start position, the start position is the start frequency and the start time, and the start time is represented by the frame offset, a start PRACH resource selected by the terminal device can only be a PRACH resource corresponding to a start frequency in a frame whose system frame number modulo the period equals the frame offset, or a start PRACH resource selected by the terminal device can only be a PRACH resource corresponding to a start frequency in an even frame whose system frame number modulo the period equals the frame offset;

when the PRACH configuration information is the preset period and the start position, the start position is the start frequency and the start time, and the start time is represented by the frame offset and the subframe number, a start PRACH resource selected by the terminal device can only be a PRACH resource corresponding to a start frequency in a subframe corresponding to a subframe number, where the subframe corresponding to the subframe number is in a frame whose system frame number modulo the period equals the frame offset, or a start PRACH resource selected by the terminal device can only be a PRACH resource corresponding to a start frequency (a frequency offset) in a subframe corresponding to a subframe number, where the subframe corresponding to the subframe number is in an even frame whose system frame number modulo the period equals the frame offset.

505. The terminal device sends a preamble to the base station starting from the start PRACH resource, so that the base station establishes a connection to the terminal device according to the preamble.

Specifically, after the terminal device obtains the corresponding start PRACH resource, the terminal device starts to repeatedly send, starting from the start PRACH resource, the preamble to the base station according to calculated sending power of the preamble.

Further, the system message from the base station further includes at least one group of extended access class barring EACB parameter, and each group of EACB parameter is corresponding to a coverage enhancement level. Before the terminal device sends the preamble to the base station starting from the start PRACH resource, the terminal device selects a corresponding EACB parameter according to the corresponding coverage enhancement level, so as to determine, according to the EACB parameter, whether the base station allows access, and if it is determined that the access is allowed, the terminal device sends the preamble to the base station.

Alternatively, if a result of the determining according to the EACB parameter is to allow access, the terminal device may further perform an extended access barring EAB decree and/or an ACB decree, where a result of the EAB decree and/or the ACB decree is used to indicate whether the preamble is sent to the base station from the start PRACH resource according to a preset frequency.

506. The base station receives the preamble from the terminal device, and performs, according to a specified random access radio network temporary identifier RA-RNTI calculation formula, scrambling on downlink resource information corresponding to the start PRACH resource.

After the terminal device sends the preamble to the base station starting from the start PRACH resource, the terminal device may further acquire, on a PDCCH channel according to the specified random access radio network temporary identifier RA-RNTI calculation formula, downlink resource information sent by the base station; and receive a random access response RAR from the base station according to a channel specified by descrambled downlink resource information, where an msg3 is sent according to a quantity of repetition times corresponding to a repetition times index carried by the RAR.

The specified RA-RNTI calculation formula may be:

$$RA\text{-}RNTI = 1 + t\_id + 10 * f\_id + X$$

X is an offset, and t_id and f_id indicate a first PRACH resource or a last PRACH resource used when the preamble is repeatedly sent.

It should be noted that, if the system message may carry the multiple sets of PRACH configuration information, and each set of PRACH configuration information is corresponding to a coverage enhancement level, when the terminal device calculates the RA-RNTI, multiple different coverage enhancement levels are corresponding to different offsets X. For example, for an enhancement level 1, the offset X may be 10, that is, RA-RNTI=1+t_id+10*f_id+10; for an enhancement level 2, the offset X is 20, that is, $$RA\text{-}RNTI = 1 + t\_id + 10 * f\_id + 20.$$

In addition, the RA-RNTI may be acquired in a manner of configuration in the system information, instead of calculation, that is, an RA-RNTI of a corresponding terminal device is carried in the system information, so as to indicate an RA-RNTI corresponding to a coverage enhancement level.

507. The terminal device acquires, on a PDCCH channel according to the specified random access radio network temporary identifier RA-RNTI calculation formula, downlink resource information sent by the base station.

The RA-RNTI calculation formula is the same as the RA-RNTI calculation formula in step 206.

Alternatively, after the base station acquires the preamble sent by the terminal device, the base station sends the downlink resource information by using a specified downlink control information DCI format. Because the specified downlink control information DCI format can only be parsed by a terminal device that requires coverage enhancement, a normal terminal device cannot parse the downlink resource information, on the PDCCH, sent by using the specified downlink control information DCI format; therefore, receiving a corresponding RAR by the normal terminal device is not affected.

Further, if the acquired downlink resource information sent by the base station carries rejection information, the terminal device quits sending the preamble to the base station within a preset period of time, where the rejection information includes a rejection instruction and/or the preset period of time.

Exemplarily, if the rejection information includes the rejection instruction and the preset period of time of one minute, after acquiring the rejection information, the terminal device may not initiate an access request for coverage enhancement within one minute.

It should be noted that, the step in which "if the acquired downlink resource information sent by the base station carries rejection information, the terminal device quits sending the preamble to the base station within a preset period of time" does not depend on steps 501 to 506, and may be performed independently.

508. The base station sends a random access response RAR to the terminal device.

Optionally, the system information sent by the base station may further include configuration information for receiving the RAR, where content of the configuration information for receiving the RAR is a time-frequency resource corresponding to the RAR. After completing sending the preamble, the terminal device receives the RAR on the corresponding time-frequency resource according to the configuration information for receiving the RAR, and does not need to acquire, on the PDCCH channel according to the specified random access radio network temporary identifier RA-RNTI calculation formula, the downlink resource information sent by the base station.

509. The terminal device receives the random access response RAR from the base station, and sends an msg3 according to a quantity of repetition times corresponding to a repetition times index carried by the RAR.

In this case, the terminal device obtains the corresponding start PRACH resource, and then sends the preamble to the base station, so that the base station establishes the connection to the terminal device according to the preamble. In this way, access of another terminal device is not affected when the base station identifies an access request of a terminal device that requires coverage enhancement.

According to the random access method provided in this embodiment of the present invention, at least one group of physical random access channel PRACH configuration information that has been stored is acquired, where the at least one group of PRACH configuration information is carried in system information sent by a base station; the at least one group of PRACH configuration information is parsed to obtain a corresponding start PRACH resource; and a preamble is sent to the base station starting from the start PRACH resource, so that the base station establishes a connection to a terminal device according to the preamble. In the solution, the base station pre-configures multiple groups of PRACH configuration information for a terminal device that requires coverage enhancement and sends the multiple groups of PRACH configuration information to the terminal device, so that the terminal device parses the PRACH configuration information to obtain a corresponding start PRACH resource, and then sends a preamble to the base station, so that the base station establishes a connection to the terminal device according to the preamble. In this way, access of another terminal device is not affected when the base station identifies an access request of the terminal device that requires the coverage enhancement.

Embodiment 7

Figure 9:
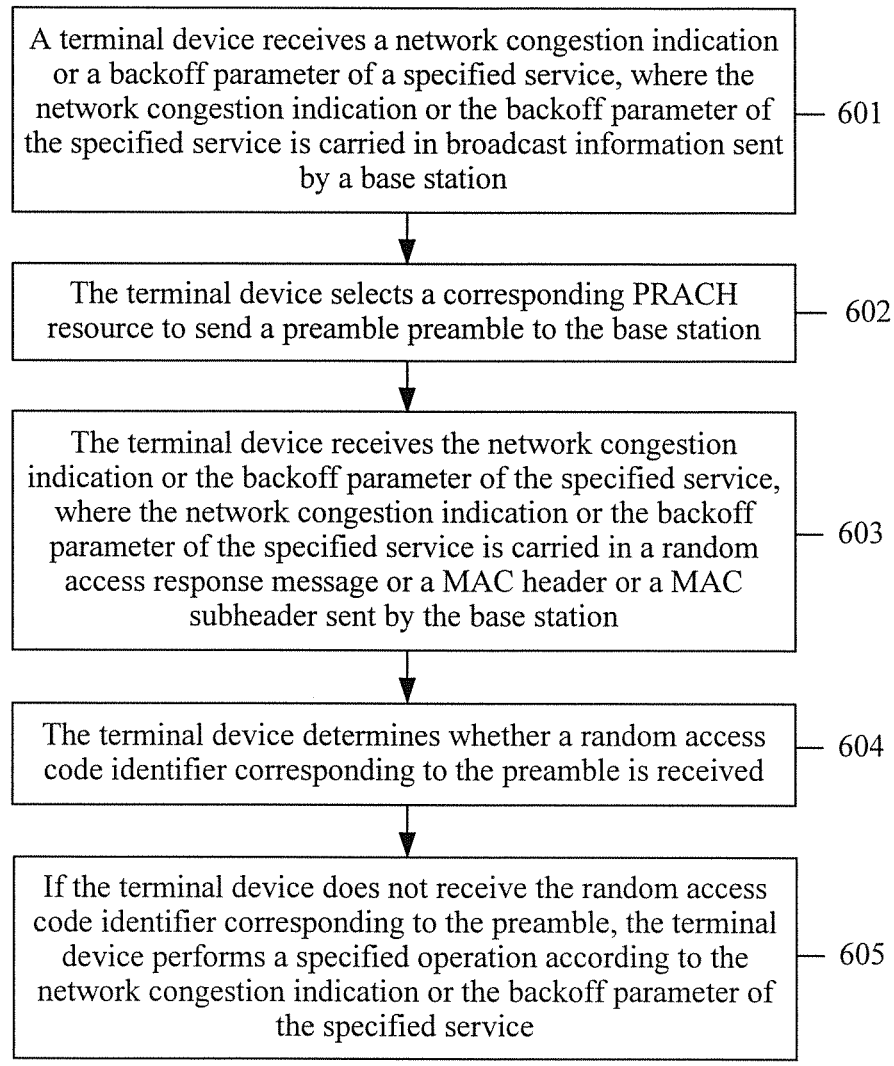
FIG. 9 is a schematic flowchart of a method for improving random access efficiency for a specified service according to an embodiment of the present invention.

This embodiment of the present invention provides a method for improving random access efficiency for a specified service. As shown in FIG. 9, the method includes the following steps:

601. A terminal device receives a network congestion indication or a backoff parameter of a specified service, where the network congestion indication or the backoff parameter of the specified service is carried in broadcast information sent by a base station.

The network congestion (congestion) refers to a case in which when a quantity of transmission packets is extremely large in a packet switched network, network transmission performance decreases because store-and-forward node resources are limited. When congestion occurs in a network, generally a data loss, a delay increase, and a throughput decrease may occur, and even a "congestion collapse" (congestion collapse) may be caused in a severe case. In normal cases, when network performance decreases because load in the network excessively increases, the network congestion may occur.

The backoff parameter of the specified service may include a backoff parameter used for access of a service such as high priority access, an emergency call, an IMS voice, or an IMS video.

In a process of random access, for the specified service (several types of services, for example, the high priority access, the emergency call, the IMS voice, and the IMS video), this embodiment of the present invention provides a method for improving a priority of an access request corresponding to the specified service, so that access of these types of services is easier to be successful, and user experience is enhanced.

602. The terminal device selects a corresponding PRACH resource to send a preamble to the base station.

An access type of the preamble sent to the base station by the terminal device is one of the high priority access, the emergency call, the IMS (IP multimedia subsystem, IP multimedia subsystem) voice, and the IMS video.

Specifically, the terminal device triggers the specified service and sends the preamble to the base station to request to perform random access. After receiving the corresponding preamble, the base station determines whether to establish a connection to the terminal device, and if the base station allows access of the terminal device, the base station sends a random access response RAR message to the terminal device, where the random access response message may include a random access code identifier corresponding to the preamble.

603. The terminal device receives the network congestion indication or the backoff parameter of the specified service, where the network congestion indication or the backoff parameter of the specified service is carried in a random access response message or a MAC header or a MAC subheader sent by the base station.

The network congestion indication or the backoff parameter of the specified service may be carried in the broadcast information sent by the base station, or may be carried in the random access response message or the MAC (Media Access Control, media access control) header or the MAC subheader sent by the base station. The MAC resolves a problem of how to allocate right of use of a channel when competition occurs in use of a shared channel in a local area network.

It should be noted that, steps 601 and 603 describe in detail a method for acquiring the network congestion indication or the backoff parameter of the specified service; therefore, either of steps 601 and 603 may be selected to be performed.

604. The terminal device determines whether a random access code identifier corresponding to the preamble is received.

605. If the terminal device does not receive the random access code identifier corresponding to the preamble, the terminal device performs a specified operation according to the network congestion indication or the backoff parameter of the specified service.

If the terminal device receives the network congestion indication, and the terminal device does not receive the random access code identifier corresponding to the preamble, the terminal device does not perform a backoff (backoff) operation, and then continues to select a proper random access resource to initiate access.

If the terminal device receives the backoff parameter of the specified service, and the terminal device does not receive the random access code identifier corresponding to the preamble, the terminal device performs the backoff (backoff)) operation based on the backoff parameter of the specified service, and then selects a proper random access resource to initiate access.

The backoff parameter is a backoff parameter value index or a backoff parameter proportion.

According to the method for improving random access efficiency for a specified service provided in this embodiment of the present invention, a terminal device sends a preamble to the base station starting from a start PRACH resource; receives a network congestion indication or a backoff parameter of the specified service; determines whether a random access code identifier corresponding to the preamble is received; and if the terminal device does not receive the random access code identifier corresponding to the preamble, performs a specified operation according to the network congestion indication or the backoff parameter of the specified service. In the solution, the specified operation is performed according to the network congestion indication or the backoff parameter of the specified service, which improves a priority of an access request corresponding to the specified service, makes access of these types of services easier to be successful, and enhances user experience.

Various aspects are described in this specification with reference to a terminal and/or a base station and/or a base station controller.

User equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS, Personal Communication Service) phone, a cordless telephone, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base transceiver station (BTS, Base Transceiver Station) in GSM or CDMA, may also be a NodeB (NodeB) in WCDMA, and may further be an evolved NodeB (NodeB, eNB, or e-NodeB, evolutional Node B) in an LTE, which is not limited in the present invention.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal device, comprising:
   a receiver, configured to:
      acquire at least one group of physical random access channel (PRACH) configuration information which is carried in system information, wherein each group in the at least one group corresponds to a respective coverage enhancement level;
      acquire, on a physical downlink control channel (PDCCH) according to a specified random access radio network temporary identifier (RA-RNTI) calculation formula, downlink resource information, wherein the specified RA-RNTI calculation formula comprises:
      RA-RNTI=1+t_id+10*f_id+X, wherein, X is an offset that corresponds to the respective coverage enhancement level, t_id and f_id indicate one of (a) a first PRACH resource or (b) a last PRACH resource used when the preamble is repeatedly sent;
   a processor, configured to
      match corresponding PRACH configuration information according to a matched coverage enhancement level and acquire a corresponding start PRACH resource according to the corresponding PRACH configuration information; and
   a transmitter, configured to:
      send a preamble starting from the start PRACH resource, and
      quit sending the preamble for a preset period of time when the acquired downlink resource information indicates rejection information, wherein the rejection information includes the preset period of time.

2. The terminal device according to claim 1, wherein the system information comprises the at least one group of PRACH configuration information, wherein content of the PRACH configuration information comprises a preset periodic time and/or a preset start position.

3. A base station, comprising:
   a processor, configured to:
      pre-configure a physical random access channel (PRACH) resource, and generate at least one group of PRACH configuration information to send to a terminal device, wherein each group in the at least one group corresponds to a respective coverage enhancement level, and
      acquire a corresponding start PRACH resource according to the corresponding PRACH configuration information;
   a receiver, configured to:
      receive a preamble from the terminal device, and
      perform, according to a specified random access radio network temporary identifier (RA-RNTI) calculation formula, scrambling on downlink resource information corresponding to the start PRACH resource, wherein the specified RA-RNTI calculation formula comprises:

RA-RNTI=1+t_id+10*f_id+X, wherein, X is an offset that corresponds to the respective coverage enhancement level, t_id and f_id indicate one of (a) a first PRACH resource or (b) a last PRACH resource used when the preamble is repeatedly sent; and a transmitter, configured to:

send, on a PDCCH channel, scrambled downlink resource information which indicates rejection information, wherein the rejection information instruct to quit sending a preamble for a preset period of time, and wherein the rejection information includes the preset period of time.

4. A random access method, comprising:

acquiring at least one group of physical random access channel (PRACH) configuration information which is carried in system information, wherein each group in the at least one group corresponds to a respective coverage enhancement level;

matching corresponding PRACH configuration information according to a matched coverage enhancement level;

acquiring a corresponding start PRACH resource according to the corresponding PRACH configuration information;

sending a preamble to the base station starting from the start PRACH resource;

acquiring, on a PDCCH channel according to a specified random access radio network temporary identifier (RA-RNTI) calculation formula, downlink resource information, wherein the specified RA-RNTI calculation formula comprises:

RA-RNTI=1+t_id+10*f_id+X, wherein, X is an offset that corresponds to the respective coverage enhancement level, t_id and f_id indicate one of (a) a first PRACH resource or (b) a last PRACH resource used when the preamble is repeatedly sent; and quitting sending the preamble to the base station for a preset period of time when the acquired downlink resource information indicates rejection information, wherein the rejection information includes the preset period of time.

5. The method according to claim 4, wherein the system information comprises the at least one group of PRACH configuration information, wherein content of the PRACH configuration information comprises a preset periodic time and/or a preset start position.

6. A random access method, comprising:

pre-configuring a physical random access channel (PRACH) resource, and generating at least one group of PRACH configuration information to send to a terminal device, wherein each group in the at least one group corresponds to a respective coverage enhancement level; and acquires a corresponding start PRACH resource according to the corresponding PRACH configuration information;

receiving a preamble from the terminal device, and performing, according to a specified random access radio network temporary identifier (RA-RNTI) calculation formula, scrambling on downlink resource information corresponding to the start PRACH resource, wherein the specified RA-RNTI calculation formula comprises:

RA-RNTI=1+t_id+10*f_id+X, wherein, X is an offset that corresponds to the respective coverage enhancement level, t_id and f_id indicate one of (a) a first PRACH resource or (b) a last PRACH resource used when the preamble is repeatedly sent; and sending, on a PDCCH channel, scrambled downlink resource information which indicates rejection information, wherein the rejection information instruct to quit sending a preamble for a preset period of time, and wherein the rejection information includes the preset period of time.

* * * * *